United States Patent [19]

Kalnasy et al.

[11] 4,228,613

[45] Oct. 21, 1980

[54] TAMPER PROOF RODENT BAITING STATION

[75] Inventors: Kenneth A. Kalnasy; Marcia Kalnasy, both of Madison Heights, Mich.

[73] Assignee: Kaplan-Stern Environmental, Inc., Troy, Mich.

[21] Appl. No.: 935,659

[22] Filed: Aug. 21, 1978

[51] Int. Cl.³ ........................................... A01M 25/00
[52] U.S. Cl. .................................................... 43/131
[58] Field of Search ................... 43/60, 64, 121, 131, 43/132 R, 133; 119/1, 19

[56] References Cited

U.S. PATENT DOCUMENTS

| | | | |
|---|---|---|---|
| 794,323 | 7/1905 | Small | 43/131 |
| 1,086,610 | 2/1914 | Nunes | 43/131 |
| 1,309,606 | 7/1919 | Bartholomew | 43/131 |
| 1,532,486 | 4/1925 | Harrington | 119/19 |
| 2,683,326 | 7/1954 | Gardner et al. | 43/131 |
| 3,857,364 | 12/1974 | Miller | 119/1 |

FOREIGN PATENT DOCUMENTS

| | | | |
|---|---|---|---|
| 981172 | 5/1951 | France | 43/131 |
| 193851 | 2/1938 | Switzerland | 43/131 |

Primary Examiner—Nicholas P. Godici
Assistant Examiner—Robert P. Olszewski
Attorney, Agent, or Firm—Krass & Young

[57] ABSTRACT

A durable rodent baiting device which is safe for use around children, domestic animals and wildlife. A substantially rectangular box is provided with upright side and end walls. The end walls have openings therein to permit the rodents to enter the interior of the box. A plurality of baffle members, disposed parallel with the end walls, extend upwardly to the top of the box and across the full width of the box. The outermost baffles, nearest the end walls, have openings therein which are offset from the openings in their associated end walls so as to prevent children or the like from gaining access to further interior portions of the box. A divider between adjacent baffle members defines at least one receptacle for the rodent bait. A cover and means for securing the cover to the box are also provided to prevent unauthorized tampering.

10 Claims, 3 Drawing Figures

4,228,613

TAMPER PROOF RODENT BAITING STATION

BACKGROUND OF THE INVENTION

This invention relates to rodent bait containers. More specifically, it involves a durable box for holding rodent bait and rodenticides which is safe for use around children, domestic animals and wildlife, yet is effective in killing the rodents.

A variety of rodent killing devices have been known in the art. However, they have had several drawbacks. For example, many of them have not been safe for children, domestic animals or wildlife. A recent Environmental Protection Agency regulation (F.I.F.R.A. amended 1972) has required all rodenticides be kept out of reach of children, pets and wildlife and should be used only in tamper proof bait stations. Moreover, the prior art devices have not proved to be durable over long periods of use. Similarly, the design of known devices have been faulty in that they do not prevent contamination of the rodent poison from environmental conditions, for example, by water entering the device. Still other disadvantages of the prior art are that their design necessitated high construction costs, did not provide easy means for replenishing the rodent poison, and were not totally effective in killing the rodents.

SUMMARY OF THE INVENTION

According to the present invention, the rodent baiting device is a substantially rectangular box having upright side and end walls, with the end walls having openings therein to permit the rodents to enter the interior of the box. A plurality of baffle members are disposed parallel with the end walls and extend upwardly to the top of the box and across the entire width of the box thereby adding ridigity to the box. The outermost baffles nearest the end walls have openings therein which are offset from the openings in their associated end walls so as to prevent children and the like from gaining access to further interior portions of the box. A divider between adjacent baffles defines at least one rodent feeding station in which the poison bait is placed. A cover and means for securing the cover to the box are also provided to prevent unauthorized tampering.

In a preferred embodiment, the feeding station includes two inclined plates defining a shute into which the poison can be readily inserted upon opening the cover of the box. In another embodiment, the baffle members define at least one trac for holding poison powder. The tracs are positioned along passageways to the bait feeding station thereby insuring that the rodent will walk on the poison powder on its way to and from the feeding station.

BRIEF DESCRIPTION OF THE DRAWINGS

Other advantages of this invention will become apparent upon reading the following specification and by reference to the accompanying drawings in which.

DESCRIPTION OF THE PREFERRED EMBODIMENTS

Figure 1:
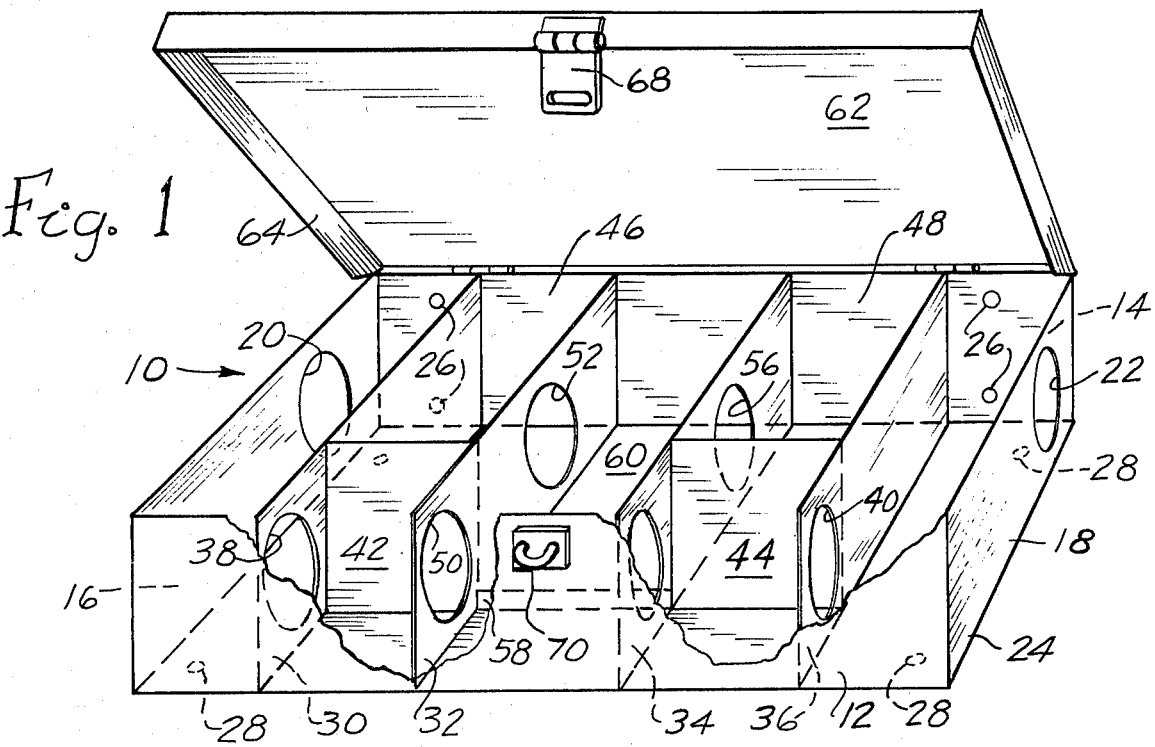
FIG. 1 is a perspective view with parts broken away of one embodiment of the present invention.

Referring now to FIG. 1, there is shown a substantially rectangular box 10 having upright side walls 12 and 14, as well as end walls 16 and 18. The box 10 is of an all-metal construction and preferably is made of 22 gauge steel. End walls 16 and 18 have openings 20 and 22 therein, respectively. Openings 20 and 22 are typically approximately three inches in diameter and are disposed towards one of the side walls and terminate approximately one inch above the bottom 24 of the box. Mounting holes 26 and 28 are provided on the back side wall 14 and bottom 24 of the box 10 in order to facilitate easy mounting of the device. In this embodiment, the box 10 is approximately eight inches in width, six inches in height, and twenty-four inches long.

A plurality of baffle members 30–36 extend entirely across the width of the box parallel to end walls 16 and 18. Furthermore, they extend the entire height of the box as can be seen clearly in the drawings. Baffles 30–36 can be attached to the box, for example, by welding. Since baffles 30–36 extend the entire width of the box they add rigidity and strength to the device. The outermost baffles 30 and 36 include openings 38 and 40 therein respectively. Openings 38 and 40 are offset or misaligned from the openings 20 and 22 in their associated end walls 16 and 18. For example, opening 38 is offset from opening 20, whereas opening 40 is similarly offset from opening 22. Accordingly, this prevents children from reaching through entrance openings 20 and 22 and gaining access to the interior portions of the device in which the rodent poison is placed.

Dividers 42 and 44 extend across adjacent baffle members to form two interior bait feeding compartments 46 and 48, respectively. Divider 42 joins baffles 30 and 32 and extends the entire height of the box. Similarly, divider 44 joins baffles 34 and 36 and extends the entire height of the box. Baffle 32 includes two openings 50 and 52. Opening 50 is aligned with opening 38 in baffle 30, whereas opening 52 provides an entrance way into feeding station 46. Similarly baffle 34 includes openings 54 and 56. Opening 54 is aligned with opening 40 in baffle 36, with opening 56 providing an entrance way into feeding station 48. It should be noted that all of the openings hereinbefore described are spaced at least one inch above the bottom 24 of the box to prevent contamination of the poison within the interior of the box 10.

A lip 58 approximately one inch high extends across baffles 34 and 32 to form a trac 60 defined on its remaining sides by baffle 32, side wall 14, and baffle 34. Trac 60 provides a tray for holding poison powder which when walked upon the rodents ingest into their system. Since the trac 60 is immediately adjacent the entrance ways 52 and 56 into either of the bait feeding stations 46 and 48, the rodent must walk on trac 60 in order to get to the bait.

A cover 62 is provided with a lip portion 64 about its periphery to prevent contamination of the interior portions of the box 10 when cover 62 is closed. Cover 62 is coupled to the upper portion of the side wall 14 by an internal hinge 66. While in this embodiment hinge 66 is an internal hinge, other types of hinges can be utilized. Cover 62 also includes a hasp 68 which cooperates with hook 70 on the front side wall 12 to securely latch the cover 62 on top of box 10. A suitable padlock (not shown) can be used to lock the cover and permit access into the interior portions of the box only by authorized personnel.

In order to use the device of the present invention, poison bait is placed in feeding stations 46 and 48, with poison powder being placed in trac 60. Cover 62 is closed and locked via hasp 68. The box 10 is then placed in an appropriate location. It can be permanently mounted through the use of mounting holes 26 and 28. The rodent enters into box 10 through openings 20 or 22 and then proceeds through opening 38 and 50 or 40 and 54 to trac portion 60. It should be noted that the rodent must always travel on trac 60 in order to get to either of the feeding stations 46 or 48. After progressing through trac 60 the rodent enters either of bait feeding stations 46 or 48 in which it eats the poison bait. Therefore, this invention provides two-fold killing method, one being the poison powder and the other being the poison bait.

Figure 2:
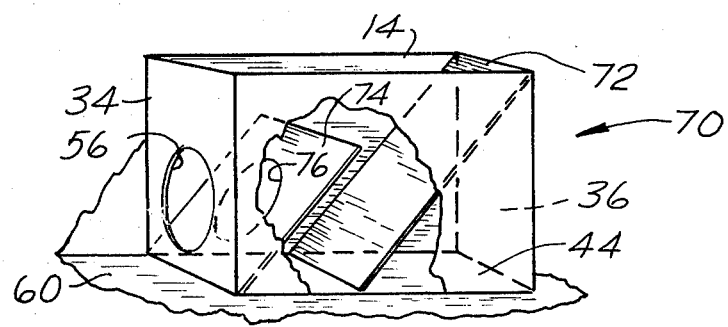
FIG. 2 is a perspective view with parts broken away of another embodiment of a rodent feeding station.

FIG. 2 shows an alternative embodiment of a bait feeding station construction. Bait feeding station 70 as shown in FIG. 2 can be utilized in either of the bait feeding stations 46 and 48 shown in FIG. 1. For ease in perceiving the relationship with the embodiment shown in FIG. 1, the same reference numerals will be utilized to refer to common portions. Station 70 includes two substantially parallel inclined plates 72 and 74 which extend across the full width of the compartment defined by the surrounding walls. Plate 72 is joined to the bottom of the compartment substantially at the middle thereof, while being terminated flush with the top of the compartment. In contrast, plate 74 terminates below the top of the compartment. Plate 74 also includes an opening 76 which faces opening 56. In such manner, plate 72 and 74 form a shute into which poison bait, such as poisoned grain, can be readily placed by opening the cover 62 of the box. The grain is directed by gravity towards opening 76 so that a continuous supply of poison will be provided. Consequently, the rodent enters opening 56 and may feed on the grain emmanating from opening 76. Hence, it can be seen that the feeding station 70 construction of this embodiment provides a means by which a large amount of poison can be readily placed into a feeding station and provide a prolonged feeding of the rodents without further replenishment.

Figure 3:
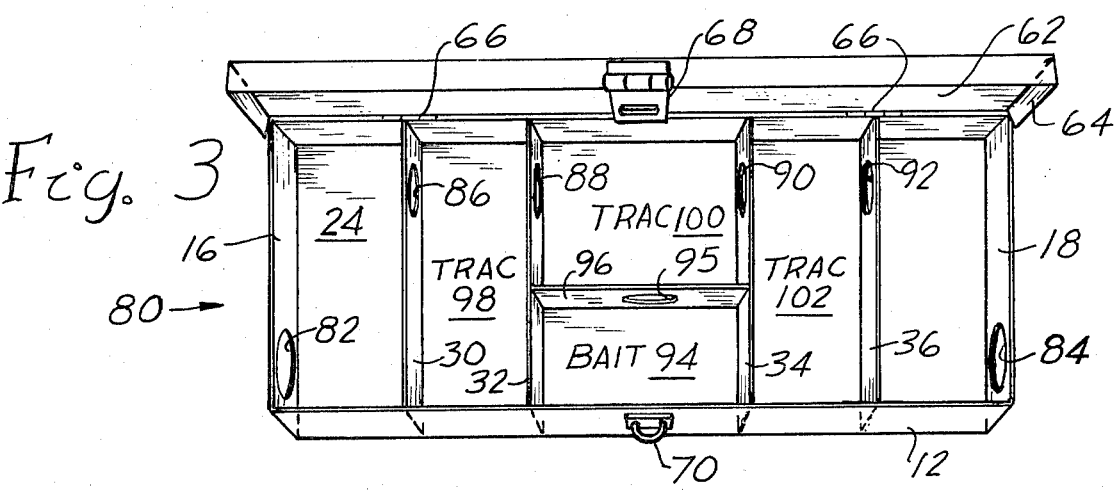
FIG. 3 is a top plan view of another embodiment of the present invention.

FIG. 3 shows an alternative embodiment of the passageways defined by the various baffles and dividers therein. Device 80 is similar to that shown in connection with the embodiment of FIG. 1. Hence, the same reference numerals will be utilized to refer to common portions. In this embodiment, openings 82 and 84 in end walls 16 and 18 are disposed forwardly of the box. Openings 86–92 in baffles 30–36, respectively, are again misaligned with openings 82 and 84 in order to prevent access to the interior portions of the box. A single bait feeding station 94 is defined by a divider 96 extending across baffles 32 and 34. An opening 95 provides an entranceway into station 94. The layout of this embodiment provides tracs 98, 100, and 102 as can be seen in the drawings. Consequently, poison powder can be placed in these compartments which insures that the rodent will contact the poison on its way to and from bait feeding station 94. The baffles and location of the openings define a maze in which the rodent may become confused thereby prolonging the contact with the poison powder in the various tracs.

Therefore, it can be seen that the present invention provides an extremely durable and safe rodent baiting device. Furthermore, while this invention has been described in connection with various embodiments thereof, no limitation is intended thereby except as defined in the appended claims.

The embodiments of the invention in which an exclusive property or privilege is claimed are defined as follows:

1. A rodent baiting device comprising:
   a substantially rectangular box having upright side and end walls, said end walls each having openings therein adjacent to a common first side of the box to permit rodents to enter the interior of the box;
   a plurality of baffle members disposed parallel to the end walls and extending across the entire width of the box and the full height of the box, the outermost baffles nearest the end walls having openings therein spaced from the top and bottom of the box, disposed adjacent to a common second side of the box, opposite to said first side so as to prevent children or the like from gaining access to the section of the box between the outermost baffles;
   at least one divider extending the full height of the box between adjacent baffle members for providing at least one rodent feeding station located between the openings in the end walls of the box and an entry section located between said openings in the baffles and accessible to rodents only therethrough, said divider having a central opening connecting the feeding station to the entry section;
   a cover for the box; and
   means for securing the cover to the box to prevent unauthorized tampering.

2. The device of claim 1 which further comprises: first, second, third, and fourth baffle members;
   said plurality of baffle members including
   a first divider extending perpendicularly to the end walls and joining said first and second baffle members thereby forming a first bait feeding station;
   a second divider extending perpendicularly to the end walls and joining said third and fourth baffle members thereby forming a second rodent feeding station;
   openings in said second and third baffle members to provide entrance ways into said first and second rodent feeding stations; and
   said second and third baffle members including further openings therein forming a passageway whereby the rodent can enter either of said feeding stations.

3. The device of claim 2 which further includes a lip extending perpendicularly to the end walls and joining said second and third baffle members to form a trac for receipt of poison powder whereby the rodent must travel in the trac on its way to and from said first or second bait feeding stations.

4. The device of claim 3 wherein it is constructed entirely of metal.

5. The device of claim 4 which further includes holes in the side and bottom portions of the box to facilitate permanent mounting of the device.

6. The device of claim 5 which further includes a hinge for the cover coupled to upper portions of a side wall.

7. The device of claim 6 wherein the cover includes a lip portion about its periphery to thereby prevent contamination of the interior portions of the box.

8. The device of claim 7 wherein at least the openings in the end walls are spaced from the bottom of the box to prevent contamination.

9. The device of claim 1 wherein said feeding station further comprises:

a plurality of substantially inclined parallel plates forming a shute into which rodent poison can be readily placed, with one of the plates including an opening therein out of which said poison is fed by gravity.

10. The device of claim 9 wherein said one plate terminates below the top of the box.

* * * * *